E. G. JAY, Jr.
SYSTEM OF AUTOMATIC WATER CONTROL.
APPLICATION FILED JULY 19, 1917.

1,302,928.

Patented May 6, 1919.
4 SHEETS—SHEET 1.

INVENTOR
Edward G. Jay, Jr.
BY
Niedersheim Fairbanks.
ATTORNEYS

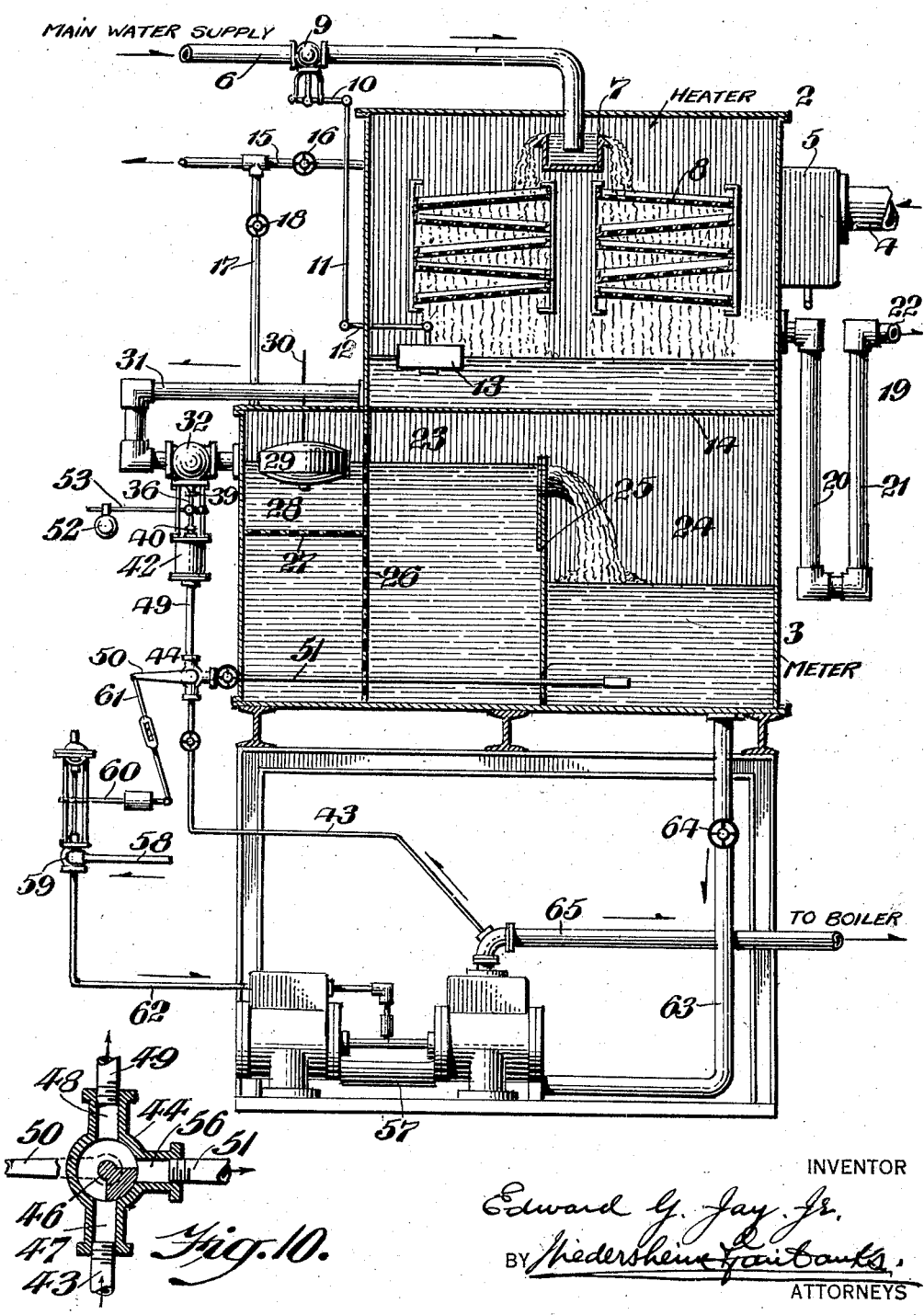

E. G. JAY, Jr.
SYSTEM OF AUTOMATIC WATER CONTROL.
APPLICATION FILED JULY 19, 1917.
1,302,928.
Patented May 6, 1919.
4 SHEETS—SHEET 3.
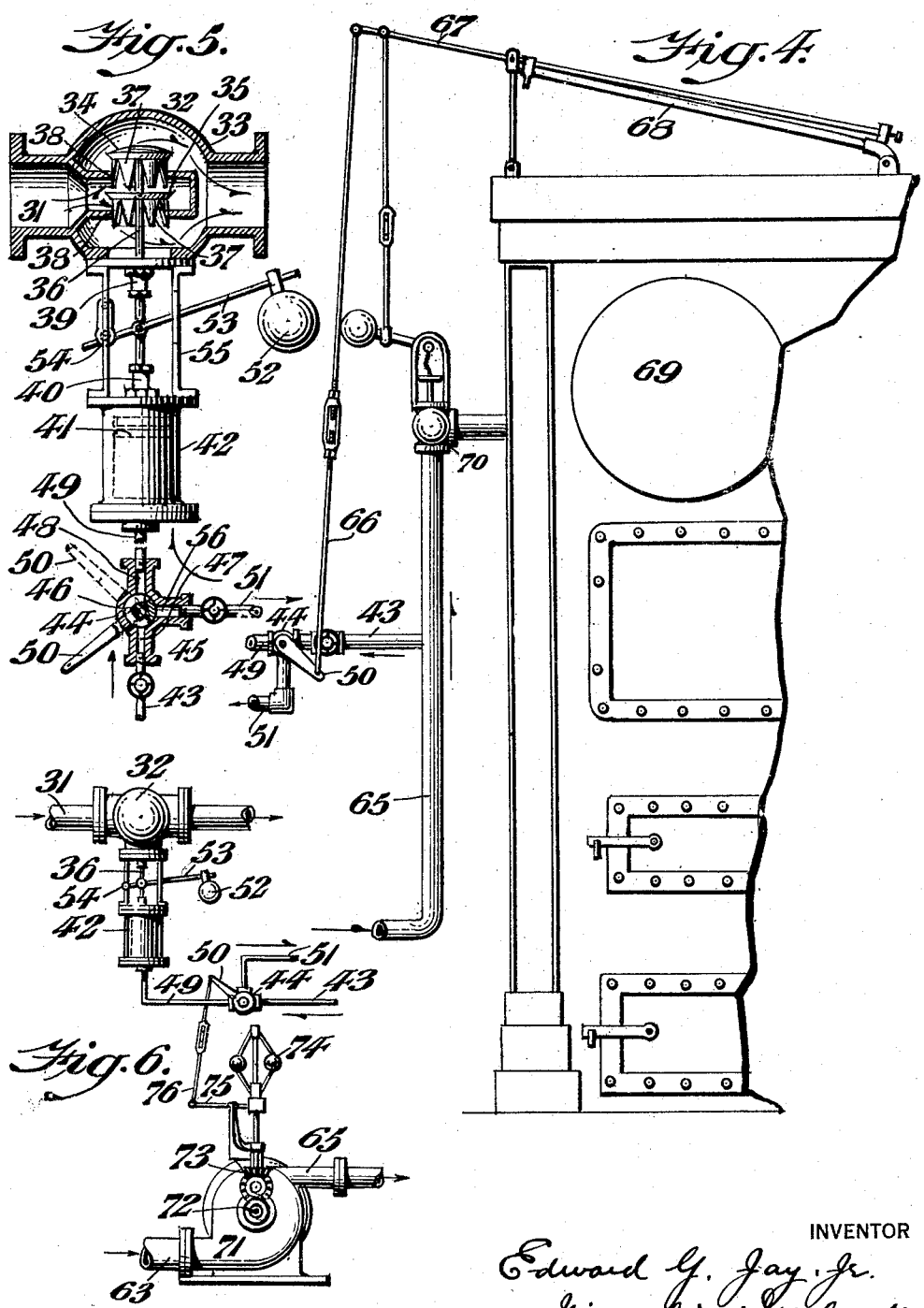
INVENTOR
Edward G. Jay, Jr.
BY
ATTORNEYS

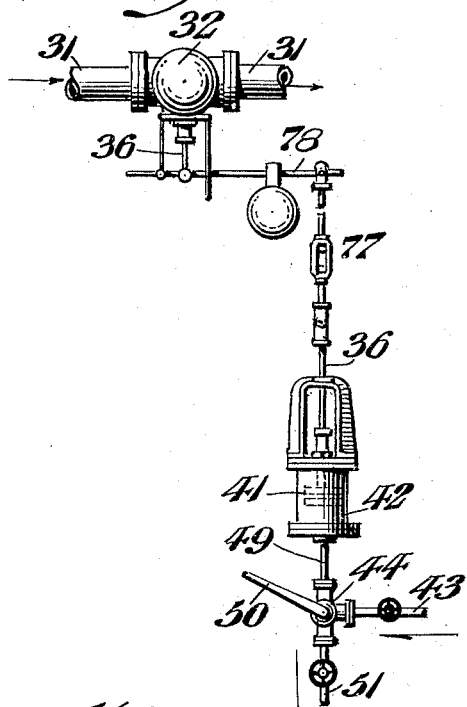
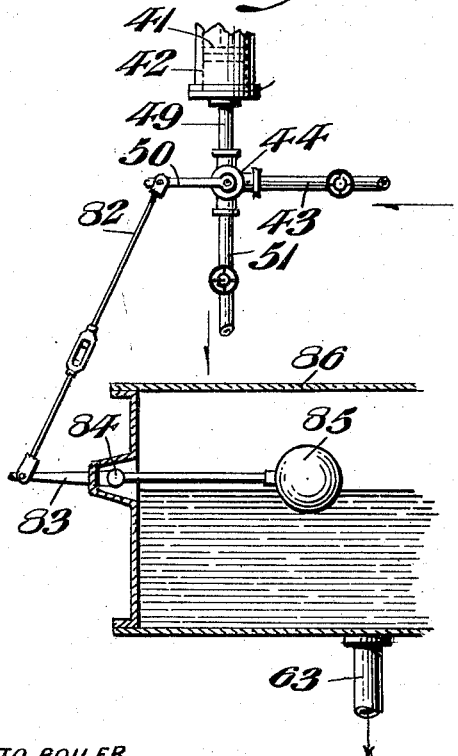
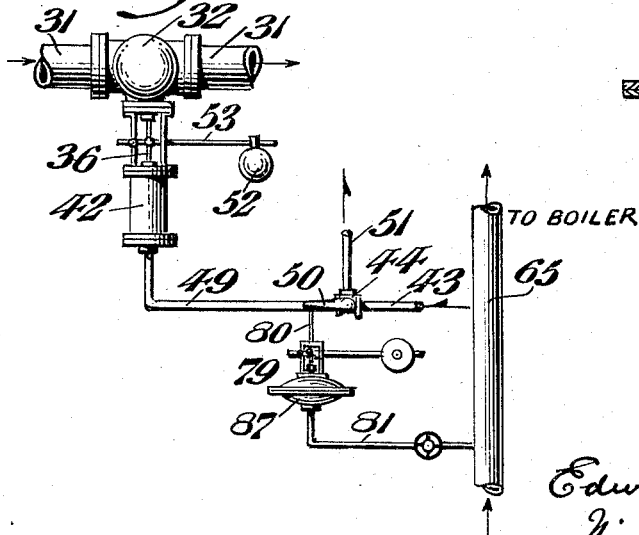

UNITED STATES PATENT OFFICE.

EDWARD G. JAY, JR., OF PHILADELPHIA, PENNSYLVANIA, ASSIGNOR TO WARREN WEBSTER & COMPANY, OF CAMDEN, NEW JERSEY, A CORPORATION OF NEW JERSEY.

SYSTEM OF AUTOMATIC WATER CONTROL.

1,302,928.  Specification of Letters Patent.  Patented May 6, 1919.

Application filed July 19, 1917. Serial No. 181,667.

*To all whom it may concern:*

Be it known that I, EDWARD G. JAY, Jr., a citizen of the United States, residing in the city and county of Philadelphia, State of Pennsylvania, have invented a new and useful System of Automatic Water Control, of which the following is a specification.

My invention relates generally to a novel system of automatic water control, wherein I assemble and collocate in a novel manner a boiler, a feed water heater, meter, novel valvular controlling devices, a feed pump and connections common thereto, whereby the control of water entering a feed water heater and the flow of water between said feed water heater and a weir or other meter is controlled and regulated in a novel manner by a pressure means proportional to boiler feed novel controlling mechanism, wherein the action of a valve is influenced by an auxiliary valve connected to a pressure line and a discharge line, said auxiliary valve being primarily actuated by a mechanical means of any character or from any source proportional to boiler feed demands, the novel features of my invention being hereinafter set forth and pointed out in the appended claims.

For the purpose of illustrating my invention, I have shown in the accompanying drawings forms thereof which are at present preferred by me, since the same will be found in practice to give satisfactory and reliable results, although it is to be understood that the various instrumentalities of which my invention consists can be variously arranged and organized, and that my invention is not limited to the precise arrangement and organization of these instrumentalities as herein shown and described.

Fig. 3 represents on an enlarged scale a vertical sectional view partly in elevation, of certain of the mechanism seen at the left of Fig. 1, but showing a slightly different arrangement of auxiliary valve, pressure line and discharge line, wherein said auxiliary valve is actuated by a boiler feed pump governor.

Fig. 4 represents on an enlarged scale, a front elevation of the boiler feed regulator, valve mechanisms, and their adjuncts, seen at the right of Fig. 1.

Fig. 5 represents on an enlarged scale a sectional view, partly in elevation, of my novel control valve, auxiliary valve and their adjuncts.

Fig. 6 represents a side elevation of my novel control valve, auxiliary valve and their adjuncts, as applied to a centrifugal boiler feed pump.

Figs. 7 and 8 represent detail views showing in side elevation other embodiments of my invention, which may be employed.

Fig. 9 represents a side elevation partly in section of another embodiment of my invention.

Fig. 10 represents a sectional view of the auxiliary valve, showing the position said valve assumes when its lever is in the position seen in Fig. 3.

Similar numerals of reference indicate corresponding parts in the figures. Referring to the drawings:—

Figure 1:
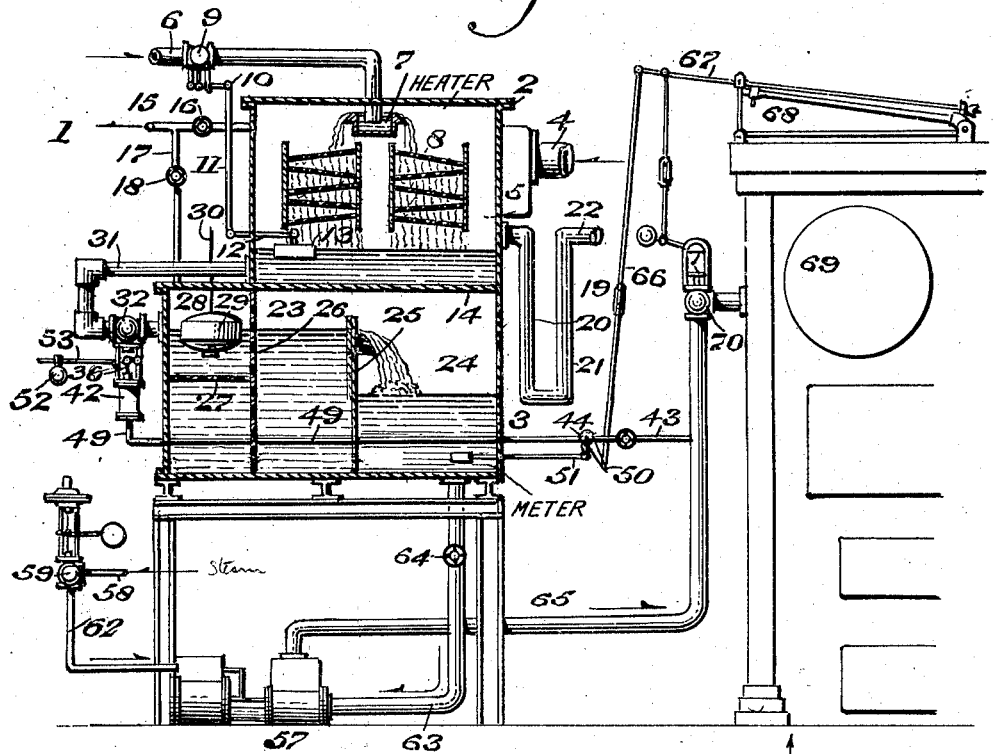
Figure 1 represents a side elevation partly in section, of an automatic water control system and its adjuncts embodying my invention, wherein the auxiliary valve is actuated by a connection from a boiler feed regulator.
Figure 2:
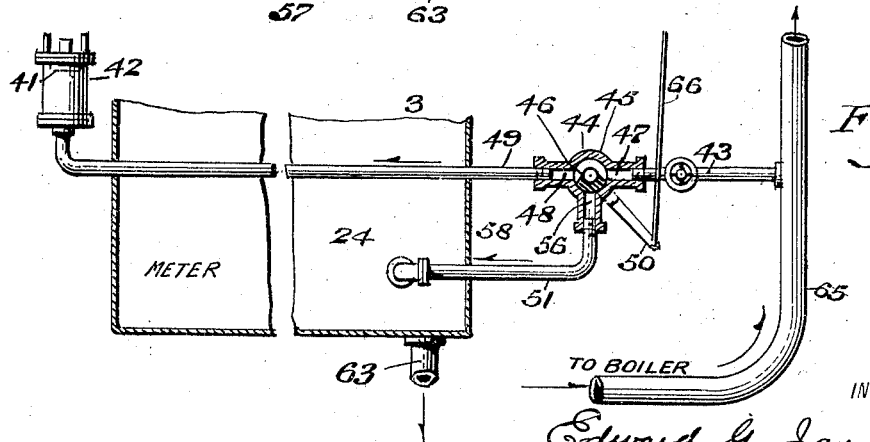
Fig. 2 represents on an enlarged scale, a side elevation partly in section of the auxiliary valve, pressure line, discharge line and their adjuncts, seen in Fig. 1.

In the construction shown in Figs. 1 and 2, I have shown the auxiliary valve in the broad embodiment of my invention as operated by a boiler feed regulator, while in Figs. 3 and 4, I have shown the operation of the auxiliary valve taken from a moving part of the pump governor, which controls the speed of the feed pump by throttling the steam supply, as seen at the left of Fig. 3.

Referring first to Figs. 1 and 2, 1 designates my novel system of automatic water control, the same comprising a feed water heater 2, and a weir meter 3, which are preferably arranged substantially as shown, the feed water heater being located in proximity to and preferably above the weir meter for convenience of manufacture, although it will be understood that said heater and meter may be variously arranged and assembled.

4 designates the inlet for the exhaust steam, which enters the feed water heater 2 after passing through the oil separator 5, said heater being of any usual or conventional type, wherein the water to be heated is admitted through the inlet pipe 6 from any source, said pipe discharging into a trough or troughs as 7, from which the water overflows upon the perforated inclined plates or trays 8.

9 designates a valve in the inlet pipe 6, the same being operated by suitable links, levers or bell cranks 10, 11, and 12, the latter being connected to the float or pan 13, wherefrom it will be seen that any variations of the water level within the heater 2 will open or close the inlet valve 9, according to requirements, it being unnecessary to describe the construction of the automatic float mechanism in further detail, as the same will be apparent to those skilled in the art.

14 designates the bottom of the heater, which, as in the present instance, may if desired form the top of the meter or measuring vessel 3. 15 designates an equalizing pipe extending from the heater 2, and provided with the valve 16 from which pipe depends the pipe 17 having the valve 18 therein, said pipe 17 communicating with the interior of the meter 3, and said pipes 15 and 17 being also in communication, so that an equalization of the pressure in the heater 2 and the meter 3 can be readily effected, by carrying said pipe 15 to a point of lower pressure or an exhausting device, as shown in patent to Warren Webster, No 524.152, granted August 7th, 1894.

19 designates a sealed overflow comprising limbs or members 20 and 21, the member 20 having its upper end in communication with the feed water heater and the outlet 22 leading to any desired point.

One form of weir meter 3 which I may employ is shown as comprising the inlet or weir chamber 23, and the exit or discharge chamber 24, the imperforate plate 25 dividing said chambers, while the weir chamber proper has the upright perforated baffle plate 26 with which is connected the laterally extending perforated plate 27, above which is formed the still water or float chamber 28, in which is contained the float 29, said float carrying a stem 30, which extends through the top of the meter and may connect with a suitable form of a registering device, not shown, and which it is unnecessary to describe in detail.

31 designates an outlet pipe leading from the bottom of the feed water heater to the chamber 23 of the meter or measuring vessel, said pipe 31 which comprises the water outlet from the feed water heater and the water inlet to the meter containing a special form of control valve 32 which I preferably employ, whose construction will now be described in detail, reference being had more particularly to Fig. 5 wherein said control valve is shown as in an open position and consists of the main valve body 33, in which are located upper and lower disks 34 and 35, which constitute the valve proper and are mounted on a spindle 36. The upper and lower disks 34 and 35 are provided with depending guides, walls or sleeves 37, which are so formed that the amount of discharge of liquid from the heater 2 to the meter 3 is limited in proportion to the rise of said disks above the valve seats 38. The spindle 36 passes through stuffing boxes 39 and 40, and at its lower portion terminates in or is secured to a piston or diaphragm 41 which reciprocates in a cylinder or casing 42. Pressure of a liquid or gas is applied through pressure pipe 43 controlled by the auxiliary valve 44, said valve comprising a casing 45, and a valve proper 46, whereby the pressure through the passages 47 and 48 is effectively controlled, as will be apparent from Figs. 2 and 5, said passage 48 leading through the pipe 49 to the bottom of the cylinder or casing 42.

It will be apparent to those skilled in the art that the pressure of a liquid or gas entering the pipe 43 when the parts are in the position seen in Figs. 2 or 5, will be conducted through the passages 47 and 48, and pipe 49 to the chamber below the piston or diaphragm 41 and will tend to raise the latter.

When the valve lever 50 is in the position seen in Figs. 1, 2, 4 and 5, the valve 46 places in communication the passages 47 and 48, and pressure will be conducted through said passages to the bottom of the diaphragm or piston 41 and tend to raise it, 43 designating the pressure line, and 51 the discharge line, said discharge line being closed when the valve 46 is in the position seen in Figs. 1, 2, 4, and 5.

A motion in the opposite direction to that imparted by the pressure through the pressure line 43 is effected by means of the weight 52 attached to the lever 53 pivoted to the spindle 36, said lever 53 being fulcrumed at the point 54, which is mounted movably on the yoke 55, common to the cylinder or casing 42, and the main valve body 33. As the valve 46 in Figs. 2 and 5 is shown in an open position with respect to the passages 47 and 48, we may assume that the pressure line 43 is open and the piston 41 has been forced upwardly to its fullest extent. It will be apparent that an upward motion of the lever 50 will uncover the passage 56 leading to the discharge line 51, and at the same time close the pressure line 43, allowing a release of pressure, whereupon the weight 52 is sufficient to cause the disks 34 and 35 to seat and close the control valve 32.

It will be obvious that any source of suitable pressure may be utilized for the operation of the controlling valve 32, and that the auxiliary valve lever 50 is actuated by a means proportional to the feed requirements of a boiler.

57 designates a boiler feed pump provided with a steam inlet pipe 58, which communicates with the pump governor 59.

In the construction seen in Fig. 1 I have shown the arm 50 of the auxiliary valve 44 actuated by the link 66 which is connected to the lever arm 67 of a boiler feed regulator 68, while in Fig. 3 I have shown a similar movement of said auxiliary valve as effected by a moving member of a pump governor 59 of any conventional type, wherein a connection is had from the governor by the links 60 and 61 to the auxiliary valve lever 50, steam being conducted to said feed pump through the steam inlet pipe 62.

63 designates the suction pipe for the feed pump 56, which is provided with a valve 64, said suction pipe leading from the discharge chamber 24 of the weir meter 3 to said pump, which has the discharge pipe 65 constituting the feed line to the boilers 69.

In the construction seen in Fig. 3, 43 designates the pressure line leading from the pump discharge 65, to the auxiliary valve 44, said pipe 43 seen in Fig. 3 being the same device structurally and functionally, as the pipe 43 seen in Figs. 1 and 2.

Referring now to the left hand portion of Figs. 3 and 5, it will be seen in the latter figure, that the discharge passage 56 and the discharge line 51 are closed, while the passages 47 and 48 are open, and pressure is exerted from the pressure line 43 upon the bottom of the piston or diaphragm 41 to open or raise the valves 34 and 35 of the controlling valve, this being the position of the system when at maximum flow, the foregoing description being also applicable to Fig. 2.

When the auxiliary valve lever 50 is in the intermediate position shown at the left of Fig. 3, and in Fig. 10, the system is in normal operation, the passages 47, 48 and 56 being partly open and adapted to be automatically and instantaneously controlled by a movement of the lever 50 proportionate to boiler feed demands, as will be understood from said Fig. 10.

The operation is as follows:—

Reference being first had to Figs. 1 and 2, it will be apparent that cold water upon being admitted through the pipe 6, flows upon the trough 7, and trays 8, whereupon it is heated by the surrounding steam entering the inlet 4, and purified of oil by the separator 5. The control of the entering water is effected by the level of the water carried in the feed water heater, any surplus of water in said heater being conducted to waste before measurement through the seal 19. The heated water is conducted through the pipe 31 into the meter 3 through the control valve 32. The measurement of water is effected in the meter 3, by the overflow through the notched plate 25, through the medium of the float 29 connected by a stem 30 to a registering instrument (not shown). The measured water from the storage or discharge chamber 24 of the meter is conducted through suction pipe 63 to the boiler feed pump 57, from whence it is discharged through pipe 65 into the boiler 69, it being understood that said feed pump 57 is in operation, steam having been admitted thereto. It will further be understood that as the feed pump is in operation there is a pressure in excess of boiler pressure in the feed line 65 to the boiler, and I utilize this pressure in said feed line for the operation of the control valve 32, by the employment of the pressure line 43, which conducts pressure to the auxiliary valve 44, it being understood from Fig. 2, that when said auxiliary valve 46, is in the position seen therein, pressure can be conducted through pipe 43 through passages 47 and 48 and the pipe 49, to the bottom of the cylinder 42, thereby elevating the piston or diaphragm 41 to the position seen in Fig. 5.

It will be seen that as the demand by the boiler for feed water varies, there will be a corresponding and proportionate movement of the lever 67 of the feed water regulator 68, see Figs. 1 and 4 which in turn through link 66 actuates to the proper extent the auxiliary valve lever 50 and the valve 46. If additional water is required by the boiler the valve 46 remains open, keeping by pressure the control valve in valve casing 33 in an open position to supply the demand, but if less water is required by the boiler a corresponding motion of the lever 67 will close off or throttle the pressure line 43 at the same time opening the discharge passage 56, see Fig. 2 and allowing a discharge of the pressure through the pipe 51 into the meter discharge chamber 24. As the water under pressure that is used to operate this system has been measured, it is obviously desirable that the discharge 51 should empty back into the measured water chamber of the meter.

It will be seen that in its broads aspects, my invention comprises the combination of the control valve 32, and auxiliary valve 44, the latter having connections with the pressure line and discharge line, said control valve 32, being operated by pressure means proportionate to boiler feed demands.

The embodiment of my invention in Figs. 1 and 2 shows the auxiliary valve 44 as being primarily operated by a moving element of a conventional type of boiler feed regulator, while in the construction seen in Figs. 3, 5 and 10, I have shown the same broad embodiment of my invention comprising the control valve 32, and auxiliary valve 44 having pressure and discharge connections, as having its operating lever connected with the boiler feed pump governor 59, it being apparent that in the broad embodiment of my invention it is immaterial from what source the auxiliary valve lever 50 is actuated, provided its movement is in proportion to boiler feed demands.

It will be obvious that as regards the boiler, the pump 57 must be operated in proportion to boiler feed demands and as the pump governor is operated by a pressure means, balanced by the said pressure, its operation will be in proportion to the amount of water pumped into the boiler. Therefore in a broad sense, a movement of the lever 60 seen at the left of Fig. 3 on the boiler feed pump governor will through the link motion 61 operate the lever 50 in proportion to boiler demands.

It will be seen that in both the embodiments of my invention above described, as illustrated in Figs. 1 and 2 and in Figs. 3, 5, and 10, that in the application of the controlling principle, I employ a pressure line 43 extending from the feed line 65 to the boiler or boilers 69 and connect it by the pipe 49 to the cylinder 42 of the control valve 32, and that the auxiliary valve 44 opens or closes the pressure line 43 and alternately opens or closes the discharge line 51, which in each embodiment of my invention empties into the outlet chamber of the meter.

The lever 50 of the auxiliary valve is operated in the case of Fig. 3 by a link mechanism, connected to a movable arm or lever of the pump governor 59, which connection effects the opening and closing of the main control valve 32 in proportion to the admission or throttling of steam to the boiler feed pump 57, hence, the action of said main control valve 32 is in construction seen in Fig. 3 in proportion to the amount of water discharged into the boiler.

In the embodiment of my invention as seen in Figs. 1 and 2, it will be apparent that the pressure is taken from the same feed line 65, as above described, by the pipe 43 but that the action of the auxiliary valve 44 is taken by the link 66 from the movable arm 67 of the boiler feed regulator 68, as seen in Figs. 1 and 4. Either the boiler feed regulator or the pump governor, as is obvious, in the two embodiments of my invention above described, operate primarily to maintain a steady water line in the boiler, one by means of throttling the discharge of the boiler feed pump, and the other by means of controlling the speed of the boiler feed pump, and therefore as these two means are directly in proportion to boiler demands, the movement of the auxiliary valve 44 in either case through the medium of the lever 50 and its appropriate connections, will proportionately control the flow of water from the feed water heater to the meter.

While the form of control illustrated in Figs. 1 and 3 has a relationship to the pressure in the feed line 65 to the boilers 69 only, it will be apparent that in the broad aspects of my invention, I may employ any available pressure, such as steam, compressed air or any other liquid or gas under pressure, which may be used as an operating medium of the control valve 32, providing the auxiliary valve 44 is actuated in proportion to the feed demands of the boiler or boilers 69.

In the construction seen in Figs. 6, 7, 8 and 9, I have shown other embodiments of the broad principle of my invention, as hereinafter explained with reference to Figs. 1, and 3, which will now be described in detail.

In Fig. 6, 71 designates a conventional type of centrifugal feed pump, having an inlet 63 and an outlet to the boiler 65 and said inlet 63 may lead from the discharge chamber 24 of the meter 3 said pipes 63 and 65 seen in Fig. 6 being structurally and functionally the same as the pipes 63 and 65 shown in Figs. 1 and 3.

72 designates the pump shaft and 73 the speed reduction gears which transmit rotation to a fly ball governor 74 of any conventional type. It is obvious that any increase of speed will actuate the arm 75 and link 76 which is connected to the auxiliary valve lever 50 of the auxiliary valve 44 which is the same as the auxiliary valve 44 already described, and seen in Figs. 1, 2, 3 and 5.

43 designates a pressure line from any source, 51 the discharge line and 49 the pipe leading to the bottom of the cylinder 42, having the spindle 36 which communicates with the valve or valves in the interior of the control valve 32, it being apparent that the parts 31, 32, 36, 42, 43, 44, 49, 50 and 51 seen in Fig. 6 are the same structurally and functionally as the similarly indicated pipes in Figs. 1, 3, and 10.

It will thus be seen that the admission of pressure and the discharge of pressure for actuating the control valve will be in proportion to the varying speed of the centrifugal boiler feed pump 71, which in turn will obviously deliver feed water to the boiler in proportion to boiler feed demands, and that the broad principle of my invention as indicated in Fig. 6 is generally the same as indicated in Figs. 1 and 3, already described in detail.

The construction seen in Fig. 7, illustrates the same broad principle of my invention, embodying a pressure pipe 43, a discharge pipe 51, a lever 50, and an auxiliary valve 44 admitting pressure through the pipe 49 into the cylinder 42, said pressure acting against the piston or diaphragm 41 which will tend to raise or lower the spindle 36, through link mechanism 77 which is attached to the lever 78 connected to the spindle 36 of an ordinary water control valve, which if desired may be the valve 32, seen in Fig. 5.

The principle illustrated in Fig. 7 may be applied to the control of a water regulator valve already installed in a plant, and would obviously result in a closer regulation and a movement in exact proportion to boiler feed demands.

In Fig. 8, I have shown the control valve 32 as provided with an inlet 31, a spindle 36, a cylinder 42, inlet pipe 49, an auxiliary valve 44, having the lever 50, the pressure line 43, and discharge line 51, all of the character heretofore described.

In said Fig. 8, the presure in the line 43 may be from any liquid or gas under pressure, but the lever 50 of the auxiliary valve 44 is actuated by a common type of weighted diaphragm valve 79, whose stem 80 is connected to the arm 50 of the auxiliary valve 44, the movement or actuation of said stem 80 being effected by reason of variable pressures entering the diaphragm chamber 87 through the pipe 81 connected to the pipe 65, said pipe 65 in Fig. 8 being the same pipe 65 as seen in Figs. 3 and 4.

It will be clear to those skilled in the art that any pressure of liquid or gas may be used for the operation of the main control valve 32 but the lever 50 of the auxiliary valve 44 will be actuated in proportion to boiler feed demands, if the flow of water through pipe 65 is in similar proportion.

In the construction shown in Fig. 9, I have shown the same cylinder 42 and piston or diaphragm 41, inlet pipe 49, auxiliary valve 44, pressure line 43, discharge line 51 and valve lever 50, which have already been described in detail. I have shown the auxiliary valve lever 50, as being actuated by the link 82 connected with the float lever 83, which is fulcrumed at 84 and carries on its inner end the float or its equivalent 85 which is controlled by the level of the water within a vessel 86 supplying water to a boiler feed pump through the pipe 63, which may be the same structurally and functionally as the pipe 63, seen in Figs. 1, 2, and 3, it being understood that said tank 86 may be of any suitable water storage vessel.

In the construction seen in Fig. 9, it will be apparent that the water level in the tank 86 varies according to the withdrawal of water through the pipe 63 by the boiler feed pump, and that there will be a corresponding rise or fall of the float 85 and a corresponding eventual movement of the lever 50 to admit or discharge pressure under the piston or diaphragm 41, thus making the function seen in this figure, similar to that of the other devices shown, and in proportion to the demands of the boiler for feed water.

It will be clear from the foregoing that I have disclosed in my present application a motor operatively connected with the main controlling valve. This motor is in turn controlled by an auxiliary valve, and the auxiliary valve is automatically actuated proportionately and in accordance with the feed demands of the boiler.

It will now be apparent that I have devised a novel and useful construction of a system of automatic water control, which embodies the features of advantage enumerated as desirable in the statement of the invention and the above description, and while I have, in the present instance, shown and described a preferred embodiment thereof which will be found in practice to give satisfactory and reliable results, it is to be understood that the same is susceptible of modification in various particulars without departing from the spirit or scope of the invention or sacrificing any of its advantages.

Having thus described my invention what I claim as new and desire to secure by Letters Patent, is:—

1. The combination in a boiler, of a heater, a meter, a pipe common thereto, a control valve in said pipe, a pressure line, a discharge line, and an auxiliary valve in communication with said pressure line and discharge line and admitting pressure or discharging pressure to means actuating said control valve in proportion to boiler feed demands.

2. A system of water control, including in combination a heater, a meter in communication therewith, a main valve controlling such communication, an auxiliary valve controlling said main valve, a boiler feed line, and means automatically actuated in accordance with feed demands on said boiler feed line to actuate said auxiliary valve.

3. A system of water control, including in combination, a heater, a meter in communication therewith, a main valve controlling such communication, a boiler feed line, a conduit leading from said boiler feed line to said main valve to actuate it, an auxiliary valve controlling said conduit, and means controlled in accordance with feed demands on said boiler feed line to actuate said auxiliary valve.

4. A system of water control, including in combination, a heater, a meter, a conduit connecting said heater and meter, a main valve in said conduit having its valve stem provided with a diaphragm, means to conduct motive fluid to one side of said diaphragm to control the opening of said main valve, an auxiliary valve controlling said motive fluid conducting means, a boiler feed line, and means controlled in accordance with feed demands on said boiler feed line to regulate said auxiliary valve.

5. A system of water control, including in combination, a heater, a meter, a conduit connecting said heater and meter, a main valve in said conduit having its valve stem provided with a diaphragm, means to conduct motive fluid to one side of said diaphragm to control the opening of said main valve, a weight to effect the closing of said main valve, an auxiliary valve controlling said motive fluid conducting means, a boiler feed line, and means controlled in accordance with feed demands on said boiler feed line to regulate said auxiliary valve.

6. A system of water control including in combination, a heater, a meter, a conduit communicating with said heater and meter, a main valve, a pressure line to conduct motive fluid to said main valve to actuate it, an auxiliary valve controlling said pressure line, a discharge line from said auxiliary valve to said meter, and means automatically controlled to actuate said auxiliary valve.

7. A system of water control including in combination, a heater, a meter, a conduit communicating with said heater and meter, a main valve, a pressure line to conduct motive fluid to said main valve to actuate it, an auxiliary valve controlling said pressure line, a discharge line from said auxiliary valve to said meter, a feed line, and means automatically actuated in accordance with feed demands on said feed line to regulate said auxiliary valve.

8. A system of water control, including in combination a main controlling valve, a motor connected with it and comprising a cylinder, a piston therein, and a piston rod common to said piston and main valve, a boiler feed line in communication with said motor to actuate it, an auxiliary valve controlling such communication, a pump for said boiler feed line, and a governor for said pump operatively connected with said auxiliary valve to regulate it.

9. In a device of the character stated, a heater, a meter in proximity thereto, a conduit connecting said heater and meter, a main valve in said conduit, a valve rod connected thereto, a piston on said rod, a cylinder for said piston, an inlet pipe leading to said cylinder, an auxiliary valve in said pipe, a boiler feed line, a conduit leading from the latter to said auxiliary valve, and a discharge line for said auxiliary valve.

10. In a device of the character stated, a heater, a meter in proximity thereto, a conduit connecting said heater and meter, a main valve in said conduit, a valve rod connected thereto, a piston on said rod, a cylinder for said piston, counterbalancing means for said main valve and piston, an inlet pipe leading to said cylinder, an auxiliary valve in said pipe, a boiler feed line, a conduit leading from the latter to said auxiliary valve, and a discharge line for said auxiliary valve.

11. In a device of the character stated, a heater, a meter coacting therewith, a conduit common to said heater and meter, a main valve in said conduit, a cylinder, a piston in said cylinder, a rod common to said piston and main valve, a boiler feed line, a pipe leading therefrom to said cylinder below said piston, an auxiliary valve in said latter pipe, and a discharge line leading from said valve.

12. In a device of the character stated, a heater, a meter, a conduit common thereto, a main valve in said conduit, a cylinder, a piston therein, a rod common to said piston and main valve, a boiler feed line, a pipe leading therefrom to said cylinder, an auxiliary valve in said latter pipe, a discharge line leading from said valve, and means operated proportionately to boiler feed demands for actuating said auxiliary valve.

13. The combination of a control valve, a cylinder, a piston therein, a rod common to said piston and control valve, a pipe leading to said cylinder, an auxiliary valve in said pipe, a pressure line leading to said auxiliary valve, a discharge line leading from said auxiliary valve, a boiler and means operated proportionately to boiler feed demands for actuating said auxiliary valve.

14. The combination of a heater, a meter, a pipe common thereto, a control valve in said pipe, a boiler feed line, a pressure line leading therefrom to said control valve, an auxiliary valve in said pressure line, a discharge line for said auxiliary valve, and means operated proportionately to boiler feed demands for actuating said auxiliary valve.

15. The combination of a control valve, a cylinder, a piston therein, a rod common to said piston and control valve, a pipe leading to said cylinder, an auxiliary valve in said pipe, a pressure line leading to said auxiliary valve, a discharge line leading from said auxiliary valve, and means operated proportionately to boiler feed demands for actuating said auxiliary valve, in combination with counterbalancing means for said control valve and piston.

16. The combination of a heater, a meter, a pipe common thereto, a control valve in said pipe, a boiler feed line, a pressure line leading therefrom to said control valve, an auxiliary valve in said pressure line, a discharge line for said auxiliary valve, and means operated proportionately to boiler feed demands for actuating said auxiliary valve, in combination with counterbalancing means for said control valve.

17. The combination of a heater, a meter, a pipe common thereto, a control valve in said pipe, a boiler feed line, a pressure line leading therefrom to said control valve, an auxiliary valve in said pressure line, a discharge line leading from said auxiliary valve to said meter, and means operated proportionately to boiler feed demands for actuating said auxiliary valve.

18. The combination of a heater, a meter, a pipe common thereto, a control valve in said pipe, a boiler feed line, a pressure line leading therefrom to said control valve, an auxiliary valve in said pressure line, a discharge line leading from said auxiliary valve to said meter, and means operated proportionately to boiler feed demands for actuating said auxiliary valve, in combination with counterbalancing means for said control valve.

EDWARD G. JAY, Jr.

Witnesses:
E. HAYWARD FAIRBANKS,
C. D. McVAY.